125,441

UNITED STATES PATENT OFFICE.

PIERSON COPE, OF PERRYOPOLIS, PENNSYLVANIA.

IMPROVEMENT IN MEDICAL COMPOUNDS FOR TREATING DISEASES IN HORSES, &c.

Specification forming part of Letters Patent No. 125,441, dated April 9, 1872.

*To all whom it may concern:*

Be it known that I, PIERSON COPE, of Perryopolis, in the county of Fayette and State of Pennsylvania, have invented a new and useful Medical Compound for the Cure and Prevention of Diseases in Horses and Cattle, of which the following is a specification:

The ingredients with their proportions are: Clay, dried or burned, eighty-six pounds; sulphur, one pound; saltpeter, one pound; copperas, one pound; rosin, one pound; salt, common, ten pounds.

The above are to be well mixed together, and given twice or three times a week to the animals in doses of one tablespoonful at a time to horses and large cattle, and half the quantity to sheep.

This compound may be used with good effect for the cure of distemper, colic, and slavering in horses; bloody murrain and scouring in large cattle; foot-rot and scab in sheep. It neutralizes all acids in the stomach, cleansing the intestines, and imparting a healthy tone to the system of all stabled or confined animals. It is a good appetizer and a preventive against the contraction of disease.

I claim as my invention—

The medical compound consisting of ingredients in the proportions substantially as described.

In testimony that I claim the above I have hereunto subscribed my name in the presence of two witnesses.

PIERSON COPE.

Witnesses:
    ELLIS BAILY,
    JAS. H. SPRINGER.